United States Patent [19]
Khare et al.

[11] Patent Number: 5,367,657
[45] Date of Patent: Nov. 22, 1994

[54] METHOD AND APPARATUS FOR EFFICIENT READ PREFETCHING OF INSTRUCTION CODE DATA IN COMPUTER MEMORY SUBSYSTEMS

[75] Inventors: Manoj Khare, Fremont, Calif.; Sudarshan B. Cadambi, Portland, Oreg.

[73] Assignee: Intel Corporation, Santa Clara, Calif.

[21] Appl. No.: 955,042

[22] Filed: Oct. 1, 1992

[51] Int. Cl.⁵ .......................... G06F 9/26; G06F 9/34; G06F 13/00
[52] U.S. Cl. .................................. 395/425; 395/375; 395/250; 364/DIG. 1
[58] Field of Search .................. 395/425, 375, 250

[56] References Cited

U.S. PATENT DOCUMENTS

| | | | |
|---|---|---|---|
| 3,898,624 | 8/1975 | Tobias | 395/250 |
| 4,095,269 | 6/1978 | Kawabe et al. | 395/250 |
| 4,298,927 | 11/1981 | Berglund et al. | 395/375 |
| 4,561,052 | 12/1985 | Tateno | 395/800 |
| 4,621,320 | 11/1986 | Holste et al. | 395/425 |
| 4,755,933 | 7/1988 | Teshima et al. | 395/425 |
| 4,876,642 | 10/1989 | Gibson | 395/250 |
| 4,879,646 | 11/1989 | Iwasaki et al. | 395/375 |
| 5,113,515 | 5/1992 | Fite et al. | 395/425 |
| 5,287,512 | 2/1994 | Ellis | 395/425 |

Primary Examiner—Glenn Gossage
Attorney, Agent, or Firm—Blakely, Sokoloff, Taylor & Zafman

[57] ABSTRACT

A memory subsystem and method are disclosed in which instruction code read-prefetching is implemented in the memory subsystem itself. A single-line read-prefetch buffer is implemented in the memory subsystem. A memory controller includes an address buffer for read-prefetches, and a memory datapath includes a data buffer for read-prefetches. Smart read-prefetching is used in which only code(instruction) reads are prefetched, taking advantage of the sequentiality of code (instruction) type data as well as the page mode feature of dynamic random access memories.

10 Claims, 4 Drawing Sheets

METHOD AND APPARATUS FOR EFFICIENT READ PREFETCHING OF INSTRUCTION CODE DATA IN COMPUTER MEMORY SUBSYSTEMS

BACKGROUND OF THE INVENTION

1. Field of the Invention

The present invention relates to computer memory systems and, more particularly, to enhancements to computer memory systems in order to speed the operation of a computer.

2. Description of Related Art

Traditional computer architectures require frequent exchanges of information between one or more processing units and the computer's memory subsystem. Processors retrieve information from the memory subsystem by passing the address identifying a particular memory location to a memory controller in the memory subsystem. The memory will usually maintain both the instructions that the processor is to execute as well as the data upon which a processor is to execute the instructions. The instructions that the processor executes are frequently referred to as code, and, reading a line of code from the memory subsystem is referred to as a code-read. The information to which the processor applies the instructions is usually referred to as data, and, reading data is referred to as a data-read.

One of the parameters that limits the speed of operation of a computer is the time required to extract code and data from the memory subsystem and supply it to the processor. The memory subsystem and the processor or processors of the computer will usually exchange information over a memory bus. A conventional memory subsystem will comprise a block of dynamic random access memory (DRAM) in an array as well as control circuitry which can translate addresses into control signals for reading and writing to particular locations in the memory array. The processor supplies addresses and control signals to the memory subsystem via the memory bus. The address on a read will be translated by the DRAM controller into a memory location. The controller will then activate the memory reading circuitry of the DRAM array and cause the information from that location to be passed through the DRAM datapath, a collection of buffers, to the memory data bus, and back to the processor. The time it takes to access locations in the DRAM is one of the speed-limiting characteristics of computer architectures. For each occasion a memory location in the DRAM is accessed, a significant amount of time is required.

One enhancement that has found widespread application in the microcomputer field is the introduction of cache memories. The theory of a cache is that a system attains a higher speed by using a small portion of very fast memory along with the slower main memory of the memory subsystem. When a particular memory location is addressed by the processor, the cache memory is supplied with the entire block of memory surrounding that memory location. Statistically, subsequent memory requirements by the processor will be in consecutive locations in the memory. This is particularly true for code-reads which are very sequential and very rarely written over. Thus, when a read is requested by a processor, an entire block of memory around that location is copied to the cache which is a much faster memory. Then, subsequent reads will not have to be accessed in the main memory and retrievals from the cache will supply information to the processor relatively quickly.

A further enhancement to systems which have external cache memories is the introduction of a read-prefetch buffer. The read-prefetch buffer is used such that on a read miss in the cache, in addition to fetching the desired address, the next sequential memory location from the main memory is put into the read-prefetch buffer of the cache because there is a likelihood that it will be the next addressed block of data.

In the enhanced cache system with read-prefetching, the procedure is that on a read-miss in the cache, the missed line is fetched from the memory subsystem. In addition to fetching the missed line, the cache also prefetches the next line from the memory subsystem into the cache's read-prefetch buffer. If the next read from the cache is to the memory location which has been prefetched (prefetch hit), the cache reads the line from the read-prefetch buffer and does not have to read the line from the memory subsystem. Since the line can be read from the prefetch buffer much faster than from the memory subsystem, read response time for prefetched hits is greatly reduced.

There are a number of disadvantages in utilizing the above-described prefetching method. The approach is not useful for systems without a cache. But, caches are expensive and low cost computer systems are usually built without a cache. Another disadvantage is that following a read-miss in the cache, the next cache line is prefetched from the memory subsystem. While this line is being prefetched, if there is another miss in the cache which is not to the line being prefetched, then this miss, the second one, would be delayed (referred to as a prefetch penalty) until the prefetch finishes since there is no easy way to abort the prefetch, a high prefetch penalty. Another disadvantage to prefetching to the cache is that it results in increased bus utilization on the memory bus. If the cache line fetched into the prefetch buffer is not used by the cache before it is discarded, then the time spent on the bus prefetching the line is wasted. This results in increased bus utilization on the memory bus which prevents other agents from getting onto the bus. This increase in bus utilization is a function of the hit rate in the prefetch buffer. Typically, with the cache, this hit rate is low and more than one prefetch buffer has to be implemented in order to get a good hit rate. These buffers take up additional area on the chip resulting in higher costs. Also, with an increased number of prefetch buffers, buffer management becomes more expensive.

Therefore, it is an object of the present invention to provide an efficient prefetching approach which does not suffer the traditional disadvantages of the above-described method while still being implementable in a low-cost computer system.

SUMMARY OF THE INVENTION

It is an object of the present invention to provide an enhanced memory subsystem for use in computer architectures without requiring great additional expense.

It is also an object of the present invention to enhance the speed of computers by introducing smart read-prefetching.

It is also an object of the present invention to provide a method and apparatus which can be utilized in a cacheless computer architecture while providing enhanced memory reading performance.

These and other objects of the present invention are provided in a scheme in which read-prefetching is implemented in the memory subsystem itself. A single-line wide read-prefetch buffer is implemented in the memory subsystem. In the memory controller, an address buffer for read prefetches is supplied, and in the memory datapath, a data buffer for read-prefetch data is supplied. Smart read-prefetching is used in which only code-reads are prefetched, taking advantage of the superior sequentiality of code-type data as well as the page mode feature of dynamic random access memories.

DETAILED DESCRIPTION

A method and apparatus for enhancing memory access times in computer systems are described. In the following detailed description, numerous specific details are set forth such as specific computer components, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention.

Figure 1:
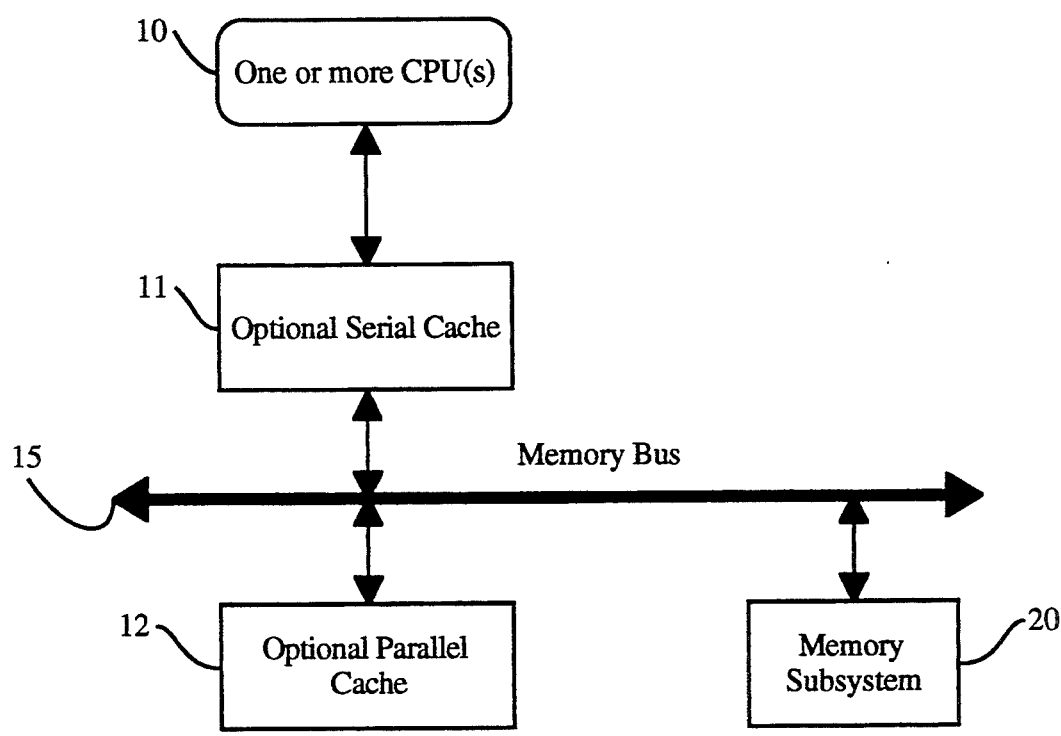
FIG. 1 shows a computer architecture in which a CPU and memory subsystem communicate through a memory bus. Optional cache memories are indicated.

Referring now to FIG. 1, a portion of a computer architecture is illustrated. In FIG. 1, the processing portion for the computer is identified as one or more central processing units collectively identified as element 10. Whether more than one processor is used, the overall architecture and relation between the memory subsystem and processing portion are essentially the same. In FIG. 1, the memory subsystem 20 is coupled to a memory bus 15. When the processing portion of the architecture requires data from the memory subsystem or needs to write data to the memory subsystem, the control signals and information are propagated along the memory bus 15. In addition to the processors and the memory subsystem residing on the memory bus, other components utilize the memory bus for various operations. Only one component is generally capable of utilizing the memory bus at one time so it is important to minimize the memory bus utilization needs of the various components.

FIG. 1 also shows an optional serial cache 11 and an optional parallel cache 12. As previously described, cache memory is usually a smaller block of very fast memory, in contrast with the relatively slow memory that is utilized as main memory in the memory subsystem. As was described in the previous section, it is known to implement prefetching in cache memories. However, as described, the disadvantages to this are (1) that a cache is required, and (2) it increases the memory bus utilization and can be particularly wasteful with large (time) penalties for cache misses which miss in the prefetch buffer.

Figure 2:
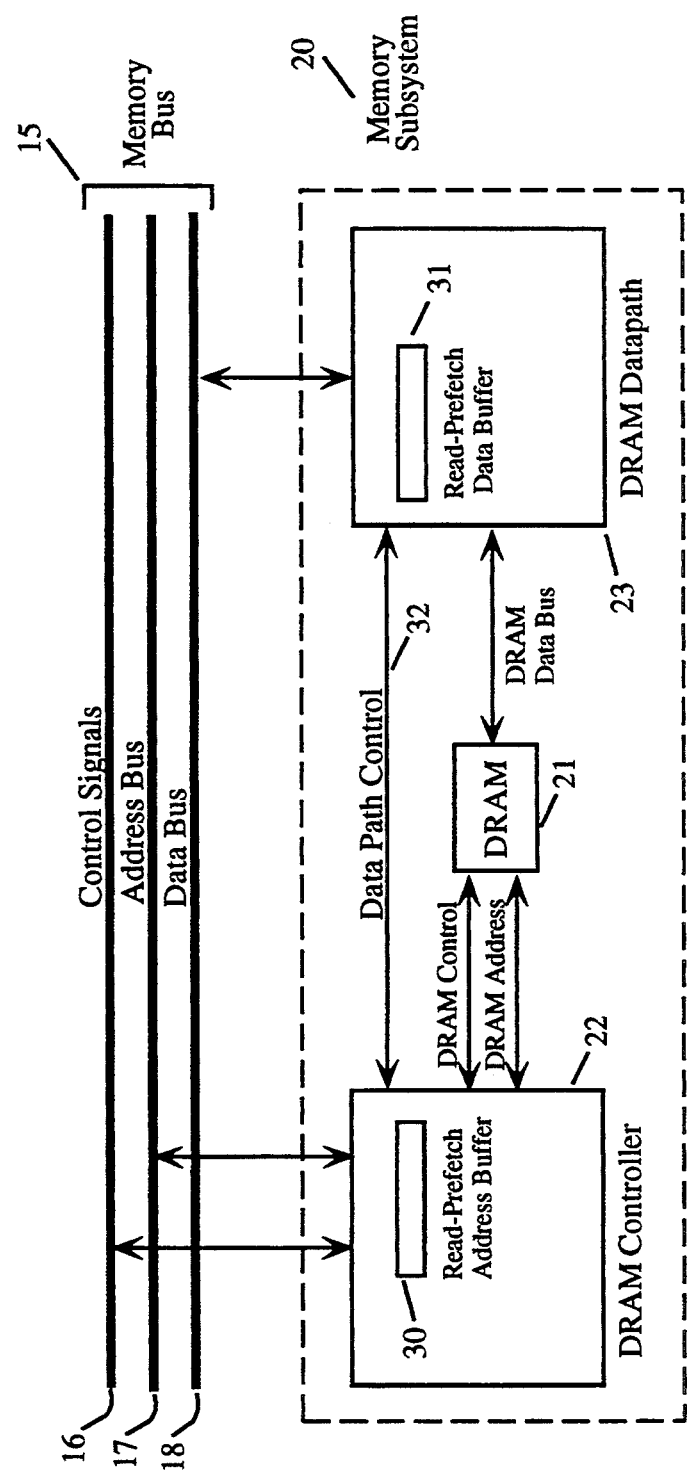
FIG. 2 is block diagram of the memory subsystem in accordance with the present invention for providing efficient read-prefetching.

FIG. 2 illustrates in more detail a block diagram of the memory subsystem 20 and the memory bus 15 showing the relevant constituent components. The diagram of FIG. 2 further illustrates the apparatus of the present invention for implementing the method of the present invention for performing read-prefetching within the memory subsystem itself. The memory bus 15 is shown as portions 16, 17 and 18 for conveying control signals, addresses and data, respectively. The memory bus may encompass many configurations and may be any arbitrary width. For convenience, it is shown in FIG. 2 as conveying three distinct types of information so three distinct constituent transmission line portions are indicated. However, no limitation is intended, and this is merely for convenience and to visually illustrate the distinctive types of information that are conveyed along the memory bus. The bus width is dependent upon the type of processor being used. For example, one processor may utilize 32-bit addresses and 32-bit data while another may utilize 32-bit addresses and 64-bit data. The width of the bus will vary accordingly.

The memory subsystem 20 in FIG. 2 is shown as a block diagram with its constituent components separately identified. The heart of the memory subsystem is an array of semiconductor memory cells illustrated as DRAM 21. DRAMs are the most commonly used memories for computer memory systems. This is due in large part to their relatively inexpensive cost and the densities at which they can be produced. In reading and writing to a DRAM, a particular address is identified by first performing a row select and then performing a column select. Newer DRAMs provide a much faster access method called page mode for successive reads or writes to memory locations on the same row. In page mode, a row is selected just once, and successive columns are selected using the next column address. Thus, a DRAM being operated in page mode provides for consecutive memory accesses with just one row address cycle instead of two. It is this page mode feature of DRAMs that is exploited by the prefetching method of the present invention.

The additional constituent elements of the memory subsystem 20 include the DRAM controller 22 and the DRAM datapath 23. The DRAM controller 22 receives control signals and addresses from the memory bus 15. It includes logic for activating rows and columns in the DRAM memory array 21 and performing other control requirements for the DRAM. Traditional DRAM controllers are well-known in the art. The DPjtM datapath 23 is a conduit between the DRAM memory array 21 and the memory bus 15. The DRAM datapath 23 comprises a collection of memory buffers so that, for example, on a memory read, the information from the DRAM array 21 is buffered in the datapath and from there, the datapath interfaces with the data bus portion 18 of the memory bus 15 for conveying the data matching the width requirements of the memory bus. Likewise, for memory writes, the data is buffered in the DRAM datapath 23 and then, under the direction of the DRAM controller 22, written to the DRAM array 21.

In accordance with a preferred embodiment of the present invention, the memory subsystem 20 of FIG. 2 is further provided with a read-prefetch address buffer 30 as part of the DRltM controller 22, a read-prefetch data buffer 31 incorporated into the DRAM datapath 23, and a datapath control line 32 coupling the DRAM controller 22 and the DRAM datapath 23. The read-prefetch address buffer 30 stores the address of the prefetched data as well as a bit for indicating whether the entry in the buffer is valid or invalid.

The present invention takes advantage of the fact that code-reads are statistically very sequential and further takes advantage of the page mode feature available in modern DRAMs. When the memory bus passes a request from a processor to the memory subsystem for a code-read, the memory subsystem first checks to see if that read has been prefetched. In the case where the code-read has not been prefetched, the DRAM is accessed by the DRAM controller so that the code data residing at the address requested is conveyed through the datapath 23 and onto the memory bus 15. Following a code-read which requires accessing the DRAM 21, the next block of data from the DRAM is prefetched. If the DRAM is in page mode, the row select will have already been done so that only a column select is required to read the next address location. However, even if the DRAM is not utilizing a page mode feature, data is still prefetched. The memory address of the prefetched location from the DRAM is stored in the read-prefetch address buffer 30 and the data residing at that address is stored into the read-prefetch data buffer 31. It is very likely that the next time a code-read is propagated to the memory subsystem 20, the requested code information will be the information that has been prefetched, a prefetch hit. If that occurs, the requested address, being the same as the address in the read-prefetch buffer, causes the datapath control line 32 to trigger the DRAM datapath 23 so that the block of data in the read-prefetch data buffer 31 is conveyed to the memory bus. On read-prefetch hits, the need for accessing the DRAM 21 is eliminated.

The method of the present invention will be described in more detail with reference to the flow chart illustrated in FIG. 3 with references made to the elements shown on the apparatus configuration of FIG. 2. Initially, at step 100, the DRAM controller 22 monitors the memory bus 15 for incoming control signals and addresses. When an incoming memory operation is detected, it is determined at decision box 101 whether or not the operation is a write operation. If the incoming operation is a write operation, then the read-prefetch address buffer 30 is snooped at box 102 to see if the address being written to is the same one that has been prefetched. If it is, the address in the read-prefetch buffer is marked invalid. It should be uncommon that this situation will occur because it is rare that the code space is overwritten. However, it is known that some applications do write into the code space. Therefore, it is necessary to make sure that no invalid data is supplied from a prefetch buffer that may have been overwritten since the time it was prefetched. After the snoop at step 102, if any prefetch operation is ongoing in the memory, it is aborted. Then the write operation is performed at step 103 in the manner that is conventional for the particular memory subsystem 20. After the write is performed, the controller returns to step 100 which monitors for incoming control signals and addresses.

If at decision box 101 it is determined that the incoming operation is not a write operation, then the routine continues to decision box 104. At decision box 104, the incoming address is compared to the address stored in the read-prefetch (RP) address buffer. If the incoming address matches the prefetched address, and the read-prefetch address buffer is marked valid, then at step 105 the DRAM controller 22 sends a control signal through the datapath control 32 to the DRAM datapath 23 which causes the data in the read-prefetch buffer 31 to be conveyed onto the memory bus 15. Thus, on a prefetch hit, the DRAM memory array 21 does not have to be accessed and the retrieval time for code data is greatly reduced.

If at decision box 104 there was no prefetch hit, indicating either a different incoming address or an address buffer marked invalid, then the procedure proceeds to decision box 106. Decision box 106 determines whether or not a previously instituted prefetch operation is still ongoing. If there is no ongoing prefetch operation, then the routine proceeds to step 110 where the requested data is read from the DRAM. If at decision box 106 it is determined that a previously instituted prefetch is still ongoing, then at decision box 107, it is tested to see whether or not that prefetch is to the memory location that is currently requested. If the previously instituted prefetch is to the same memory location that the current request is for, then at step 108 the routine waits for the prefetch to finish and marks the read-prefetch address buffer as valid. Then, at step 105, a signal is sent to supply the data from the read-prefetch data buffer as described above. If the memory location requested is hoe the same as for the previously instituted prefetch at step 107, then the previously instituted prefetch is aborted at step and the requested data is read from the DRAM at step 110.

After the data has been supplied, either from the DRAM or from the prefetch buffer, then at decision box 111 it is tested whether or not the read request was a code-read rather than, for example, a data-read. If the incoming read was not a code-read, the routine returns to the monitoring step 100. If the executed read was a code-read, then the routine proceeds to the prefetching step 112. Optionally, in some circumstances it may be desirable after step 105, on a prefetch hit, to return to monitoring step 100 without instituting a next code-read prefetch. This is because on a prefetch hit, the DRAM is not accessed.

Step 112 initiates the prefetching of the next piece of code-data. The read-prefetch address buffer is first marked invalid in case the prefetch is aborted before completion. The address of the prefetch location is stored in the read-prefetch address buffer, while, in parallel, the next cache line is prefetched and the data stored in the read-prefetch data buffer. Once the prefetch is completed, the read-prefetch address buffer is marked as valid and the routine returns to the monitoring step 100.

Figure 4:
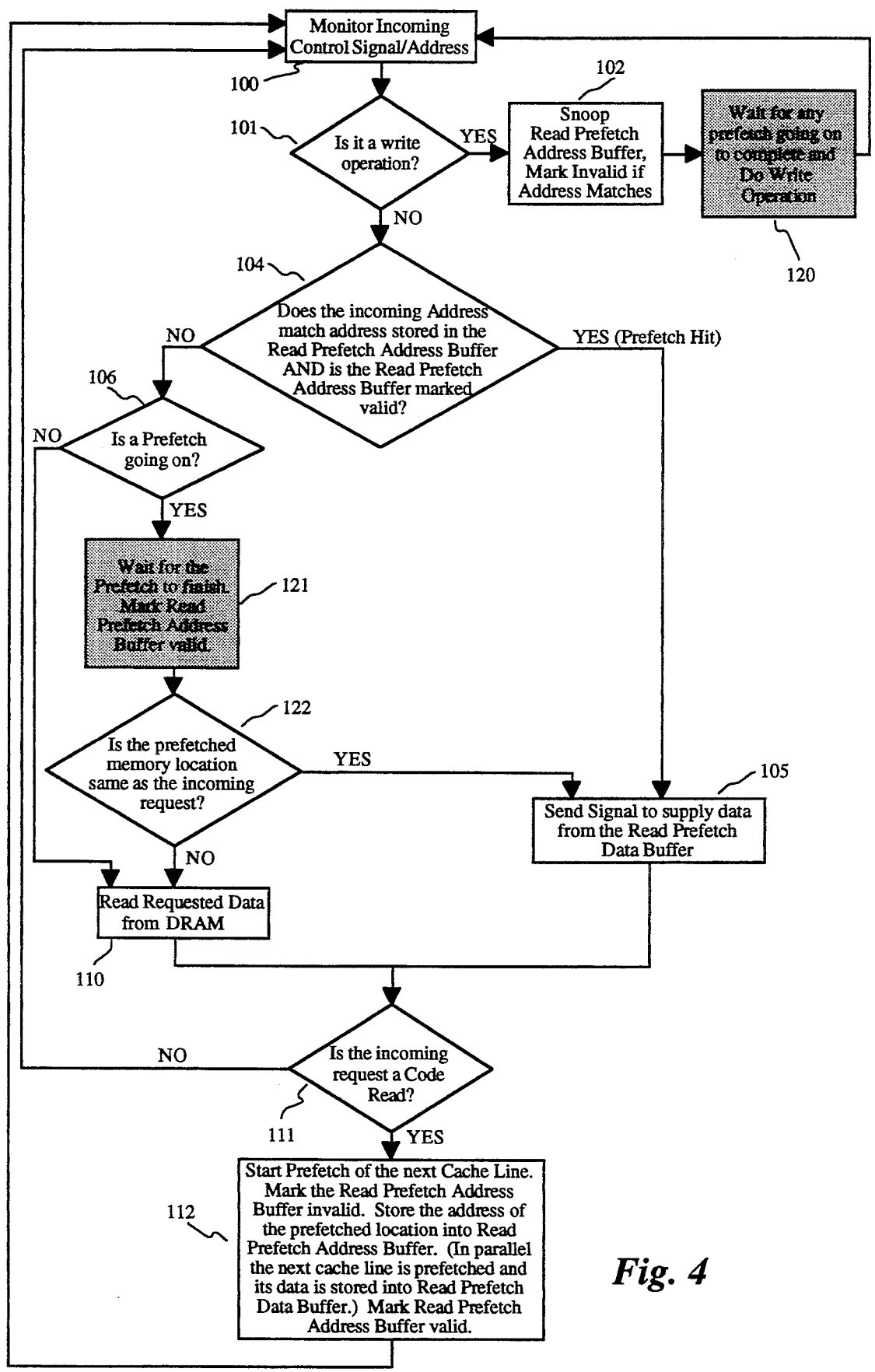
FIG. 4 is a flow chart illustrating the steps of the method of code prefetching in accordance with an alternative embodiment of the present invention.

FIG. 4 illustrates an alternative embodiment flow chart of the method of the present invention. In this alternative embodiment, ongoing prefetches are not aborted when subsequent requests are initiated. Instead, the requested transaction is delayed until the prefetch finishes. This may result in additional prefetch hits at the expense of some delays encountered while prefetches finish.

Figure 3:
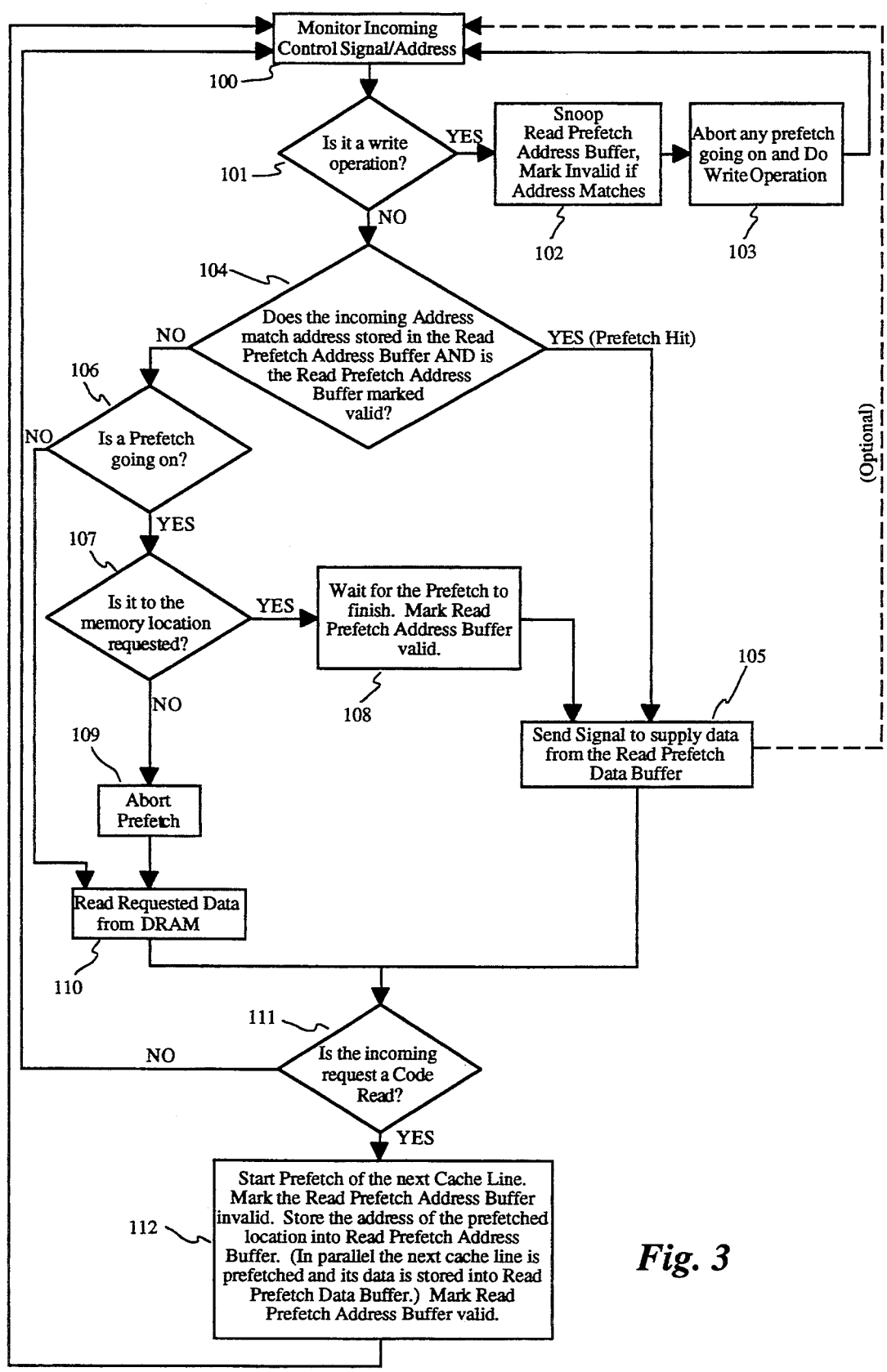
FIG. 3 is a flow chart illustrating the steps of the method of code prefetching in accordance with one embodiment of the present invention.

The flow chart embodied in FIG. 4 differs from the flow chart of FIG. 3 only in several respects. Instead of aborting any ongoing prefetches and then doing the write operation as called for by step 103 in FIG. 3, step 120 in FIG. 4 results in the controller waiting for any ongoing prefetch to finish and then instituting the write operation. Also, steps 107, 108 and 109 from FIG. 3 are replaced by steps 121 and 122 in FIG. 4. At step 121, the controller waits for a prefetch to finish if there is an ongoing prefetch and then marking the read-prefetch address buffer as valid. Then, at decision box 122, it is tested to see whether or not the prefetch memory location matches the incoming address requested and if so, supplying the data from the read-prefetch data buffer at step 105. Otherwise, the requested data is read from the DRAM at step 110 as described with respect to FIG. 3.

As indicated, the present invention is only concerned with prefetching code-reads because code-reads are relatively sequential. Thus, the step 111 only institutes a prefetch when the previous request is a code-read. The determination about whether or not an incoming address is a code-read may be performed in a number of ways, such as having control signals identify the type of operation or by comparing some characteristic feature of the address which might be used to indicate code space. The logic for doing that sort of compare operation is not illustrated in FIG. 2 but is of the type that can be easily implemented and is well-known in the art. Further, the particular method of determining whether or not an operation is a code-read is irrelevant to the overall scheme of the present invention. The same type of logic may also be implemented to determine when incoming requests are for data-reads and data-writes and, in such an event, bypassing the prefetch mechanism altogether.

There are a number of advantages to the present invention. One is that since the read-prefetching is implemented in the memory subsystem, the approach is useful even in low-cost computer systems which do not utilize a cache. Also, because everything is going on inside the memory subsystem, if there is another memory request which cannot be serviced by the prefetch buffer, the penalty is very small. Another important advantage of the present invention, which is the result of it being entirely internal to the memory subsystem, is that there is no increase in the utilization of the memory bus. Even with low prefetch buffer hit rates, this approach will result in increased bus utilization on the internal DRAM data bus but not on the external memory bus. Typically, the bandwidth available on the internal DRAM data bus is greater than that available on the memory bus so that increased utilization in the memory subsystem does not affect performance. Further, the increased utilization in the memory subsystem does not interfere with other agents on the external memory bus which need the memory bus for communicating to each other. Also, a minimum of hardware space is required for implementing this approach which only requires buffering of addresses and small amounts of data.

The descriptions above which refer to specific hardware components are for illustration purposes. For example, other memories besides DRAMs may prove suitable. Further, the physical locations of the prefetch address and data buffers may be different than those described above. An alternative embodiment of the present invention may provide for more than one prefetch buffer. In such a case, a plurality of cache lines would be prefetched and stored in the buffers. The mechanism for carrying this out is very similar to that described above for a single prefetch buffer implementation. Hit determination for prefetched addresses could then be carried out in a fully associative manner.

Although the present invention has been described in terms of a specific embodiment and some alternatives, it will be appreciated that various modifications and alterations might be made by those skilled in the art without departing from the spirit and scope of the invention. The invention should, therefore, be measured in terms of the claims which follow.

We claim:

1. A method or read-prefetching in a memory subsystem of a computer system having a central processing unit (CPU), the memory subsystem, and a memory bus by which said CPU and said memory subsystem exchange information, said memory subsystem including a memory array, a memory controller, means for storing a prefetched code address and means for storing prefetched code data, said method comprising the steps of:
   monitoring for instruction code read requests to said memory subsystem from said CPU;
   comparing an incoming instruction code read address to the stored prefetched code address;
   supplying the prefetched code data to said CPU from said memory subsystem when the compared incoming instruction code read address matches the stored prefetched code address and when the prefetched code address is valid;
   supplying data from said memory array to said CPU when the incoming instruction code read address does not match the stored prefetched code address or when the prefetched code address is invalid; and
   after supplying the Prefetched code data or the data from said memory array to said CPU, prefetching the next addressed code data from said memory array if current request is an instruction code read and storing said next addressed code data and its address in said means for storing prefetched code data and in said means for storing a prefetched code address, respectively.

2. The method of claim 1 further comprising, after said monitoring step, the step of waiting for any previously instituted prefetch to finish before proceeding.

3. The method of claim 1 wherein said prefetching step is not carried out when the data supplied to said CPU was prefetched code data.

4. The method of claim 1 further comprising the steps of:
   monitoring for write requests;
   comparing incoming write addresses to the stored prefetched code address; and
   marking the stored prefetched code address as invalid if a write address matches said stored prefetched code address.

5. The method of claim 1 wherein said step of comparing incoming instruction code read addresses to the stored prefetched code address comprises comparing the incoming instruction code read addresses to all stored prefetched code addresses when more than one code address is prefetched.

6. The method of claim 1 wherein said memory array has a page mode of operation and said prefetching step comprises the step of activating said memory array for reading from the next code memory location while said memory array is operating in said page mode of operation.

7. The method of claim 6 further comprising after said monitoring step, the step of aborting a previously initiated prefetch operation if it is still ongoing when a read request to said memory subsystem is to a memory address different from the memory address being prefetched.

8. The method of claim 7 further comprising the step of marking the prefetched code address as invalid when a prefetch is aborted.

9. An apparatus for read-prefetching is computer system having a central processing unit (CPU), a memory subsystem and a memory bus coupled to said CPU and to said memory subsystem, said memory subsystem comprising a semiconductor memory array, a memory controller coupled to said memory bus, and a memory datapath coupled to said memory bus for buffering data between said memory array and said memory bus, said memory controller for addressing said memory array, the apparatus comprising:

- a read-prefetch address buffer for storing a prefetched instruction code address;
- a read-prefetch data buffer for storing prefetched instruction code data; and
- a datapath control line for signaling said read-prefetch data buffer when said prefetched instruction code data is to be supplied to said memory bus in response to an instruction code read operation, said memory controller comparing an incoming instruction code read address from said memory bus to the prefetched code address stored in the read-prefetch address buffer, said memory controller signaling said memory datapath to supply the stored prefetched code data from said read-prefetch data buffer if said incoming instruction code read address matches said stored prefetched code address, said memory controller addressing said memory array if the compared addresses do not match and supplying requested data from said memory array and, if a current request is an instruction code read request, then prefetching the next addressed code data into said read-prefetch data buffer and storing its address in said read-prefetch address buffer.

10. The improvement of claim 9 wherein said memory array comprises a dynamic random access memory array which has a page mode of operation.

* * * * *

UNITED STATES PATENT AND TRADEMARK OFFICE
CERTIFICATE OF CORRECTION

PATENT NO. : 5,367,657

DATED : November 22, 1994

INVENTOR(S) : Khare et al.

It is certified that error appears in the above-identified patent and that said Letters Patent is hereby corrected as shown below:

On the title at [54] delete "READ PREFETCHING" and insert --READ-PREFETCHING--

In column 1 at line 3 delete "READ PREFETCHING" and insert --READ-PREFETCHING--

In column 4 at line 52 delete "DPjtM" and insert --DRAM--

In column 4 at line 67 delete "DRltm" and insert --DRAM--

In column 6 at line 27 delete "hoe" and insert --not--

In column 6 at line 29 insert --109-- following "step" and prior to "and"

UNITED STATES PATENT AND TRADEMARK OFFICE
CERTIFICATE OF CORRECTION

PATENT NO. : 5,367,657
DATED : November 22, 1994
INVENTOR(S) : Khare et al.

It is certified that error appears in the above-indentified patent and that said Letters Patent is hereby corrected as shown below:

In column 8 at line 28 delete "Prefetched" and insert --prefetched--

Signed and Sealed this

First Day of July, 1997

Attest:

BRUCE LEHMAN

*Attesting Officer*       *Commissioner of Patents and Trademarks*